(12) United States Patent
MacDuff

(10) Patent No.: US 6,893,485 B2
(45) Date of Patent: May 17, 2005

(54) METHOD AND KIT FOR USE WITH STANDARD PIPE COUPLINGS TO CONSTRUCT A DE-AERATOR

(75) Inventor: James MacDuff, Victoria (CA)

(73) Assignee: Swabey, Ogilvy, Renault, Ottawa (CA)

( * ) Notice: Subject to any disclaimer, the term of this patent is extended or adjusted under 35 U.S.C. 154(b) by 0 days.

(21) Appl. No.: 10/160,587

(22) Filed: May 31, 2002

(65) Prior Publication Data

US 2003/0221560 A1 Dec. 4, 2003

(51) Int. Cl.[7] ................................. B01D 19/00
(52) U.S. Cl. .................... 95/241; 95/242; 96/219; 96/165; 96/179; 138/41; 137/176; 137/199; 137/210; 285/31; 210/436; 210/120
(58) Field of Search ..................... 95/241, 242; 96/166, 96/167, 219, 165, 163, 179; 138/41, 96 R; 137/175, 176, 171, 197, 199, 200, 210; 285/24, 31, 27, 121, 156, 397, 398, 417, 369, 371; 210/188, 436, 120

(56) References Cited

U.S. PATENT DOCUMENTS

| | | | |
|---|---|---|---|
| 351,994 A | * | 11/1886 | Moore |
| 430,448 A | * | 6/1890 | Todd |
| 852,584 A | * | 5/1907 | Skinner |
| 897,895 A | * | 9/1908 | Harrison |
| 899,077 A | * | 9/1908 | Rowe |
| 1,114,270 A | * | 10/1914 | Kinealy |
| 1,119,980 A | * | 12/1914 | Mulligan |
| 2,237,520 A | * | 8/1941 | Brubaker et al. |
| 2,375,646 A | * | 5/1945 | Grossi |
| 2,611,446 A | * | 9/1952 | Kennedy et al. |
| 2,742,049 A | * | 4/1956 | Granberg |
| 2,897,913 A | * | 8/1959 | Hudson |
| 2,904,182 A | * | 9/1959 | Baumann |
| 3,668,822 A | * | 6/1972 | Mannion et al. |
| 3,854,906 A | | 12/1974 | Roffelsen |
| 4,027,691 A | | 6/1977 | Roffelsen |
| 4,381,928 A | | 5/1983 | Roffelsen |
| 4,427,421 A | * | 1/1984 | Jensen et al. |
| 4,456,172 A | | 6/1984 | Roffelsen |
| 4,645,518 A | | 2/1987 | Roffelsen |
| 4,678,589 A | * | 7/1987 | Ayres, Jr. |
| 4,718,922 A | | 1/1988 | Roffelsen |
| 4,961,847 A | * | 10/1990 | Amr |
| 5,490,874 A | | 2/1996 | Kuster et al. |
| 5,676,740 A | * | 10/1997 | Schwartz et al. |

* cited by examiner

Primary Examiner—Duane Smith
Assistant Examiner—Douglas J. Theisen
(74) Attorney, Agent, or Firm—Dority & Manning, P.A.

(57) ABSTRACT

A kit for constructing a de-aerator that includes a concentrator is adapted to be connected to a standard pipe coupling. The concentrator is inserted in the path of liquid conveyed through the pipe coupling for aggregating gas, and directing the gas to a cavity. The cavity is encased by the fitting which is a vertical, cylindrical sheath with one end adapted to be inserted into standard pipe couplings, and the other end adapted to be connected with the cap. The cap includes a vent adapted to open and shut in response to lowering and raising of the level of the liquid in the cavity below/above a threshold, respectively.

20 Claims, 3 Drawing Sheets

METHOD AND KIT FOR USE WITH STANDARD PIPE COUPLINGS TO CONSTRUCT A DE-AERATOR

CROSS-REFERENCE TO RELATED APPLICATIONS

This is the first application filed for the present invention.

MICROFICHE APPENDIX

Not Applicable.

TECHNICAL FIELD

This invention relates to gas removal from liquid distribution systems, and, in particular, to a de-aerator for removing gas suspended in liquids used for temperature control in closed-loop heating and cooling systems.

BACKGROUND OF THE INVENTION

A common problem with liquid heating and cooling systems, and liquid distribution systems in general, is the accumulation of gas pockets in distribution pipes. Dissolved or suspended gases separate from the liquid and naturally collect at various points in the system. Accumulations of gas may cause vapor lock that inhibits the effective distribution of the heated or cooled liquid, diminishing the efficiency of the heating or cooling system. Gas pockets may also induce noise and cause damaging cavitation in liquid distribution pumps. The introduction of gas into liquid distribution systems is therefore usually carefully controlled, but it cannot be completely avoided. Maintenance procedures, oxygen infiltration, and the injection of fresh liquid into the system all introduce some gas into the system.

Liquids that readily dissolve gasses at a temperature and pressure at which the liquids are injected into a system, and emit the gasses under operating temperatures and pressures in the system, are especially prone to the problems associated with gas accumulation. Such liquids include water, which readily absorbs oxygen and other gasses when cool, but emits the absorbed gases when heated. Because of its availability and heat transfer properties, water is commonly used in heating and cooling systems. Besides the undesirable affects of vapor locks, oxygen is a principal agent responsible for the corrosion of metal. Consequently, the removal of oxygen from heating and cooling systems is all the more desirable.

Gas removal from heating and cooling systems is well known. The gas is removed using venting devices referred to as de-aerators that are connected in various ways to the distribution pipes of the heating and cooling systems. The known de-aerators are generally expensive units that include a plurality of components encased in one or more metal housings connected to the distribution pipes. Inexpensive de-aerators are available, but they are generally much less effective at removing gas from the liquid.

An example of an expensive de-aerator is described in U.S. Pat. No. 5,490,874, entitled DE-AERATOR APPARATUS, which issued to Hans L. Kuster et al. on Feb. 13, 1996. The de-aerator includes a housing that forms an upright cylindrical chamber having fittings on opposite sides for the connection of the distribution pipes. The liquid flows through the distribution pipes into the chamber, and gas extracted from the liquid is exhausted through a valve controlled vent. The valve is opened and closed by the motion of a float that is buoyantly displaced by the rise and fall of the level of the liquid in the chamber. When the level of the liquid is below a certain point the valve is opened, permitting the accumulated gas to escape. When the liquid level is above the certain point the valve is closed, preventing the contents of the chamber from escaping. A concentrator that partially disrupts the flow of the liquid through the chamber extracts the gas bubbles and microbubbles from a liquid flowing through the chamber. The concentrator has a large surface area to volume ratio to facilitate the removal of gas from the liquid.

The less expensive de-aerators are typically adapted to be threadedly attached to a pipe fitting, such as a venting nozzle of a radiator, or other heating appliance. The less expensive de-aerators are constructed in a similar way with a float-based valve venting mechanism, but do not include a concentrator with a large surface area for removing gas from the liquid. The less expensive de-aerators are therefore adapted to remove large bubbles of gas from the liquid that rise under the force of buoyancy, but are inefficient at extracting finer bubbles and microbubbles from the liquid.

A disadvantage of all the known de-aerators is that they are expensive to construct and/or require special fittings that are time-consuming to install in a heating or cooling distribution system.

There therefore remains a need for a low-cost de-aerator that is easily installed without special fittings, and capable of efficiently extracting gas from a liquid conveyed through a distribution system.

SUMMARY OF THE INVENTION

It is therefore an object of the present invention to provide a low-cost kit for constructing a de-aerator adapted to extract gas from a liquid conveyed through a liquid distribution system.

It is a further object of the invention to provide a kit that can be installed in a standard pipe coupling to facilitate installation, reduce installation time and reduce component cost.

Accordingly, the invention provides a kit for a de-aerator for removing gas from a liquid distribution system comprising a cylindrical fitting having first and second ends, the first end being adapted to be inserted into a connector of a standard pipe coupling, and connected to the connector in a fluid-tight seal. The kit further includes a cap adapted to be connected to the second end of the fitting in a fluid-tight seal. A valve with a valve stem is connected to a float for selectively closing the valve when the liquid rises above a predetermined level in the fitting. The float opens the valve when the liquid in the fitting is displaced below the predetermined level by the gas. The kit also includes a gas concentrator adapted to extract gas from the liquid flowing through the pipe coupling, the gas concentrator being directly received in the coupling beneath the float.

The extraction of gas is facilitated by the gas concentrator, which is captively held in the flow of the liquid. The gas concentrator is constructed with a large surface area to mass ratio, so that the liquid flows through the pipe coupling without being significantly impeded by the gas concentrator. The gas concentrator causes microbubbles and bubbles of gas to merge to form larger bubbles. The larger bubbles rise under the force of buoyancy and accumulate inside the fitting.

The cap preferably supports the vent that releases the gas when the liquid level in the fitting falls below a predetermined level. As an alternative, the vent may be supported by the fitting.

The kit in accordance with the invention is simple to construct, easily and quickly installed, simple to maintain, and very cost effective because the body of the de-aerator is a standard T-coupling that is readily available at low cost.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
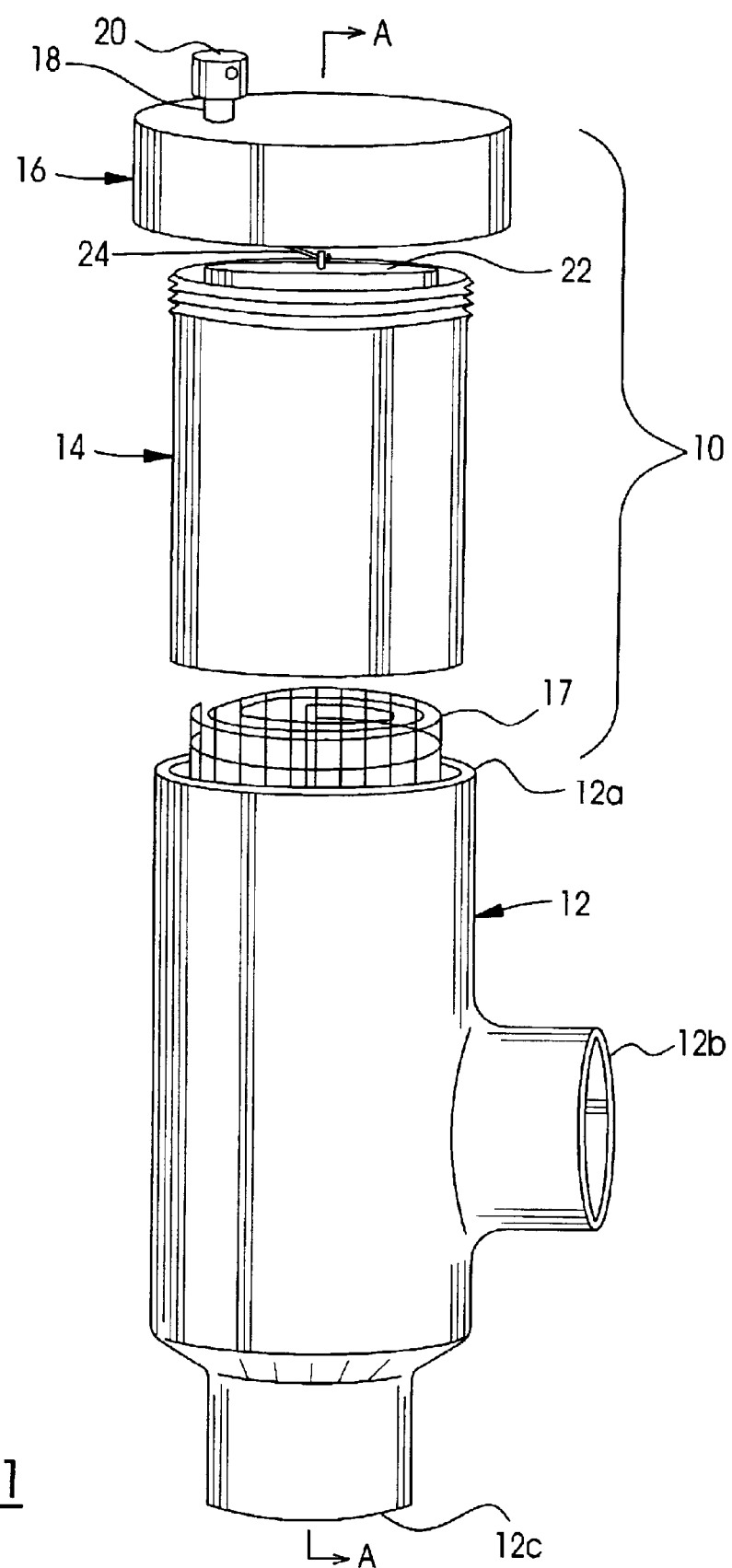
FIG. 1. is an exploded perspective diagram of a de-aerator constructed using a kit in accordance with the invention, the kit being installed in a standard T-coupling oriented in a vertical-to-horizontal run of pipe in a fluid distribution system.

The invention provides a simple and inexpensive kit for a de-aerator that is installed in a standard T-coupling in a fluid distribution system, such as a radiant heating system, for example. The kit, generally indicated by reference 10, is installed in a standard T-coupling 12 having connectors 12a, 12b and 12c which receive standard fluid distribution pipes (not shown) that are secured to the coupling 12 by soldering, threaded joints, or the like. The kit 10 includes a fitting 14 that is extruded, cast and/or machined to a diameter of a pipe received in the connector 12a of the coupling 12. The kit further includes a cap 16 that is connected to the fitting 14 in a fluid-tight seal, and a gas concentrator 17, which in this example is a metal mesh, as will be explained below in more detail. The gas concentrator 17 is inserted directly into an unobstructed fluid flow path between an inlet, the connector 12b, for example, and an outlet, the connector 12c, for example, of the coupling 12.

The fitting 14 is a cylinder preferably threaded at one end to permit connection of the cap 16, which is correspondingly threaded. The fitting 14 may be soldered or glued inside the pipe coupling 12a, in a manner well known in the art. The fitting 14 is hollow and forms a chamber 19 (FIG. 2) when the cap 16 is connected thereto.

Figure 2:
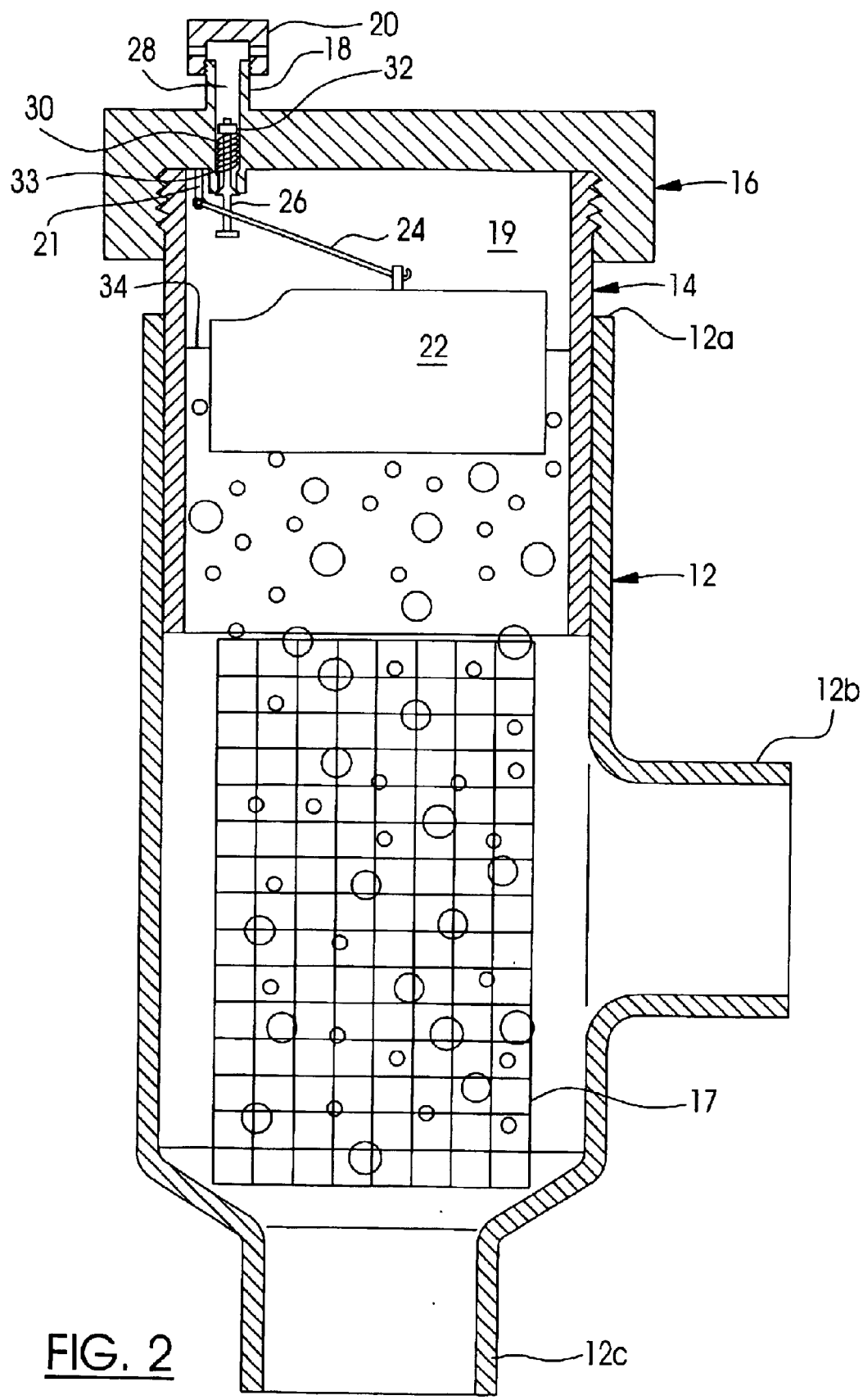
FIG. 2. is a cross-sectional view taken along lines A—A of FIG. 1, showing the de-aerator in a non-venting state.
Figure 3:
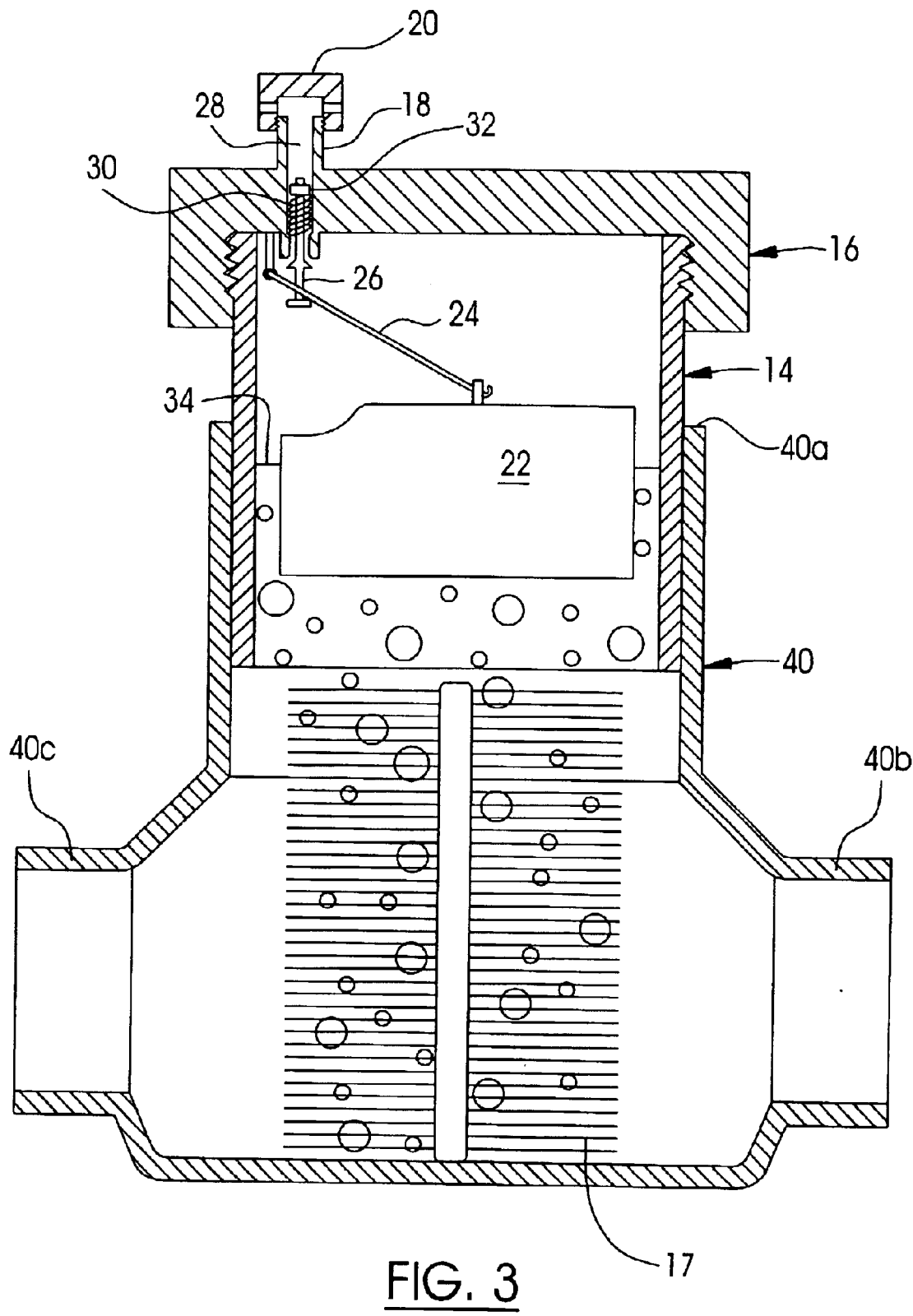
FIG. 3. is a cross-sectional view of a de-aerator constructed using a kit in accordance with the invention in a gas venting state, the kit being installed in a standard T-coupling in a horizontal run of pipe in a fluid distribution system.

The cap 16 preferably supports a valve 18. The valve 18 includes a valve cap 20 that is vented to permit gas to flow out of the de-aerator. A float 22 is connected to a lever arm 24, which is connected to a pivot support 21 affixed to the underside of the cap 16. A valve stem 26, engaged by the lever arm 24, is biased by the action of a compression spring 30 to seal a venting channel 28. The weight of the float 22 overcomes the bias of the compression spring 30 when the level of the liquid in the chamber 19, by which the float is supported, is displaced below a certain threshold by accumulated gas. The compression spring 30 is captured between a valve stem centralizer 32 and a spring seat 33 in the venting channel 28. The valve stem centralizer 32 guides the valve stem as it is reciprocated within the venting channel 28, but does not inhibit the escape of gas through the valve 18. As shown in FIG. 2, the amount of gas accumulated in the chamber 19 is inadequate to open the valve 18. In comparison, FIG. 3 illustrates a condition in which the amount of gas accumulated in the chamber 19 is adequate to displace the level of the liquid to an extent that the lever arm 24 is pulled downwardly by the weight of the float 22. This causes the valve stem 26 to be moved downwardly against the force of the compression spring 30, which opens the venting channel 28, releasing the accumulated gas. Such valve mechanisms are known in the art.

The gas concentrator 17 may be any one of various shapes and constructions known in the art. Preferably the surface area to volume ratio is maximized so that the flow is not overly restricted, but the interaction with gas bubbles suspended in the liquid is enhanced. Typical gas concentrators known in the art include cylindrical wire brushes, helicoidal metal structures and rows of combs or bristles. An alternative that is robust, efficient and inexpensive to construct, is a wire mesh fabric cut in a sheet, and loosely coiled to form a substantially cylindrical wire mesh coil with a spiral cross-section. The size of the sheet is chosen so that the wire mesh coil is easily inserted into the fixture, but the wire mesh coil is captively held in the stream of liquid beneath the float 22. As an alternative, the gas concentrator 17 may be a brush structure as shown in FIG. 3, and may be constructed from a synthetic polymer, for example.

The de-aerator functions to release gas from a fluid distribution system. Bubbles and microbubbles of gas are trapped by surface tension around parts of the gas concentrator 17. These bubbles and microbubbles aggregate to form larger bubbles of gas, which rise under their buoyancy to accumulate a layer of gas in the chamber 19 of the vertically oriented fitting 14. The gas displaces the liquid causing the level of the liquid 34 to drop. The float 22, falling with the level of the liquid 34 causes the lever arm 24 to pivot enough that the valve stem 26 is separated from a valve seat of the venting channel 28. The channel is thereby opened and venting of gas occurs. Evacuation of the gas through the venting channel 28 causes the level of the liquid to rise in response to fluid pressure in the distribution system. The rise in fluid level raises the float which closes the valve after the liquid rises above a predetermined level.

FIG. 3 is a cross-sectional view of the kit 10 installed in a T-coupling 40, which includes connectors 40a, 40b, and 40c, in a horizontal run of pipe (not shown). The installation of the de-aerator 10 begins with the selection of a point in the liquid distribution system at which the de-aerator 10 is to be installed. Preferably the installation point(s) is(are) located so that the gases, which are lighter than the liquid, will naturally collect there. After the point(s) of installation is(are) selected, an appropriately configured T-coupling 40 is installed at each point(s). The T-coupling(s) 40 is(are) installed so that the connector 40a for receiving the kit 10 is substantially vertically oriented. The fitting 14 is connected to the T-coupling using solder or glue, for example. The gas concentrator 17 is inserted into the coupling 40 via connector 40a, and the cap 16 is secured to cover the fitting 14 in a fluid-tight seal.

The connectors 12a, 40a of T-couplings 12, 40 preferably have greater cross-sectional area than pipes (not shown) to which the T-couplings 12, 40 are connected. This has two advantages. First, the gas concentrator 17 can be larger and therefore more efficient. Second, the flow rate of the liquid through the gas concentrator is slower than the flow rate through the pipes. The slowing of the liquid helps release gas bubbles that are suspended in the liquid.

It will be appreciated by those skilled in the art that there are numerous operationally equivalent embodiments of the valve mechanism, and the gas concentrators that can be used in a kit 10 in accordance with the present invention. It should also be understood that although the valve mechanism is supported by the cap, it may likewise be supported by a sidewall of the fitting 14.

The embodiments of the invention described above are therefore intended to be exemplary only. The scope of the invention is therefore intended to be limited solely by the scope of the appended claims.

I claim:

1. A kit for assembling a de-aerator for removing gas from a liquid distribution system comprising:
   a cylindrical fitting having first and second ends, the first end being adapted to be inserted into a connector of a standard T-coupling having an unobstructed fluid flow path between an inlet connector and an outlet connector thereof, and connected to the coupling in a fluid-tight seal;
   a cap adapted to be connected to the second end of the fitting in a fluid-tight seal;
   a valve with a valve stem connected to a float for selectively closing the valve when the liquid rises above a predetermined level in the fitting, and for selectively opening the valve when the liquid in the fitting is displaced below the predetermined level by the gas; and
   a gas concentrator adapted to extract gas from the liquid flowing through the standard T-coupling, the gas concentrator being directly received in the unobstructed fluid flow path of the coupling, beneath the float.

2. A kit as claimed in claim 1 wherein the cap is removably attached to the fitting.

3. A kit as claimed in claim 2 wherein a second end of the fitting is threaded and the cap is correspondingly threaded to permit the cap to be threadedly secured to the fitting.

4. A kit as claimed in claim 1 wherein the float is connected to a valve stem by a lever arm so that a buoyant force acting on the float causes the lever arm to move the valve stem to the closed position when the level of the liquid reaches the predetermined level.

5. A kit as claimed in claim 4 wherein the valve is supported by the cap and the lever arm is connected to a pivot that is also supported by the cap.

6. A kit as claimed in claim 1 wherein the gas concentrator comprises a wire mesh.

7. A kit as claimed in claim 6 wherein the gas concentrator comprises a woven wire mesh.

8. A kit as claimed in claim 7 wherein the gas concentrator comprises a sheet of woven wire mesh that is rolled into a spiral that forms a circular cylinder.

9. A kit as claimed in claim 1 wherein the gas concentrator comprises a brush.

10. A kit as claimed in claim 9 wherein the brush comprises a structure manufactured using a synthetic polymer.

11. A method of removing gas suspended in a liquid conveyed through a liquid distribution system, comprising steps of:
    installing a standard T-coupling in a run of pipe in the liquid distribution system, so that one connector of the T-coupling is in a vertical orientation and liquid in the liquid distribution system flows through an unobstructed flow path between an inlet connector and an outlet connector of the T-coupling;
    securing a fitting to the vertically oriented connector, the fitting having a first end that is adapted to be received in the connector and a second end that is adapted for the connection of a cap in a fluid-tight seal;
    inserting a gas concentrator through the fitting directly into the unobstructed flow path of the coupling; and
    connecting the cap to the second end of the fitting, the cap supporting a valve to permit gas accumulated by the gas concentrator to escape from the fitting when a certain volume of gas has been accumulated in the fitting, while inhibiting the liquid from escaping from the liquid distribution system.

12. A method as claimed in claim 11 wherein the step of installing comprises a step of soldering the other two connectors of the T-coupling in the run of pipe in the distribution system.

13. A method as claimed in claim 11 wherein the step of securing comprises a step of soldering the fitting to the vertically oriented connector of the T-coupling.

14. A method as claimed in claim 11 wherein the step of installing comprises a step of installing the T-connector in a horizontal run of pipe in the distribution system.

15. A method as claimed in claim 11 wherein the step of installing comprises a step of installing the T-connector in a vertical-to-horizontal run of pipe in the distribution system.

16. A method as claimed in claim 11 wherein the step of connecting comprises a step of threadedly connecting the cap to the fitting.

17. A kit for a de-aerator for removing gas from a liquid distribution system used for radiant heating, comprising:
    a cylindrical fitting having first and second ends, the first end being adapted to be inserted into a connector of a standard T-coupling, and soldered to connector, the T-coupling having an unobstructed fluid flow path between an inlet connector and an outlet connector thereof;
    a cap adapted to be connected to the second end of the fitting in a fluid-tight seal, the cap supporting a valve with a valve stem connected to a float for selectively closing the valve when the liquid rises above a predetermined level in the fitting, and for selectively opening the valve when the liquid in the fitting is displaced below the predetermined level by the gas; and
    a gas concentrator adapted to extract gas from the liquid flowing through the pipe coupling, the gas concentrator being directly received in the unobstructed fluid flow path of the couplings beneath the float.

18. A kit as claimed in claim 17 wherein the gas concentrator is a wire mesh sheet rolled into a spiral to form a substantially circular cylinder.

19. A kit as claimed in claim 17 wherein the gas concentrator is a brush made from a synthetic polymer.

20. A kit as claimed in claim 17 wherein the float is connected to the valve stem by a lever arm that is pivotally connected by a pivot bracket to the cap.

* * * * *

UNITED STATES PATENT AND TRADEMARK OFFICE
CERTIFICATE OF CORRECTION

PATENT NO. : 6,893,485 B2
DATED : May 17, 2005
INVENTOR(S) : James MacDuff

It is certified that error appears in the above-identified patent and that said Letters Patent is hereby corrected as shown below:

<u>Column 6,</u>
Line 38, after "and soldered to" add -- the --.
Line 52, after "path of the couplings" add -- , --.

Signed and Sealed this

Seventh Day of March, 2006

JON W. DUDAS
*Director of the United States Patent and Trademark Office*